US006032176A

United States Patent [19]
Nishimura

[11] Patent Number: 6,032,176
[45] Date of Patent: Feb. 29, 2000

[54] DATA-INDEPENDENT TYPE COMPUTER SYSTEM: PROCESSING MACHINE, DATA MACHINE AND MAN-MACHINE INTERFACE THEREIN

[75] Inventor: Takeshi Nishimura, Kawasaki, Japan

[73] Assignee: Fujitsu Limited, Kawasaki, Japan

[21] Appl. No.: 08/521,436

[22] Filed: Aug. 30, 1995

[30] Foreign Application Priority Data

Nov. 8, 1994 [JP] Japan .................................... 6-273519

[51] Int. Cl.[7] .................................................. G06F 15/163
[52] U.S. Cl. .......................................... 709/201; 709/300
[58] Field of Search ........................ 395/200.03, 200.06, 395/200.09, 670, 672; 707/100, 10; 709/200, 201, 202, 300; 712/1, 32

[56] References Cited

U.S. PATENT DOCUMENTS

| | | | |
|---|---|---|---|
| 4,513,370 | 4/1985 | Ziv et al. ............................ | 395/200.06 |
| 4,516,205 | 5/1985 | Eing et al. .......................... | 395/200.06 |
| 4,658,353 | 4/1987 | Whittaker et al. ................. | 395/200.06 |
| 4,803,614 | 2/1989 | Banba et al. . | |
| 4,839,798 | 6/1989 | Eguchi et al. ...................... | 395/200.06 |
| 4,888,683 | 12/1989 | Koizumi et al. .................... | 395/200.06 |
| 4,949,248 | 8/1990 | Caro .................................... | 395/200.06 |
| 4,958,278 | 9/1990 | Meguro ............................... | 395/200.06 |
| 5,031,089 | 7/1991 | Liu et al. ............................ | 395/200.06 |
| 5,202,989 | 4/1993 | Hirosawa et al. ...................... | 395/675 |
| 5,475,816 | 12/1995 | Yonezawa et al. ................. | 395/200.06 |
| 5,630,061 | 5/1997 | Richter . | |
| 5,638,511 | 6/1997 | Nezu . | |
| 5,671,408 | 9/1997 | McBride ................................. | 707/100 |

OTHER PUBLICATIONS

Robert Y. Hou, Jai Menon, Yale N. Patt (IEEE 1993) Balancing I/O Response Time and Disk Rebuild Time in a RAID 5 Disk Array.

*Primary Examiner*—Dung C. Dinh
*Attorney, Agent, or Firm*—Staas & Halsey

[57] ABSTRACT

A processing machine has an electronic statement sending and receiving portion and a job process executing portion. The electronic statement sending and receiving portion sends and receives electronic statements that include a job process request, a job process result, a data access request, and a data access result to and from a network. The job process executing portion executes job processes corresponding to the electronic statements. A data machine has an electronic statement sending and receiving portion, a data storing portion, and a data accessing portion. The electronic statement sending and receiving portion sends and receives electronic statements that includes a data access request and a data access result to and from the network. The data storing portion stores data. The data accessing portion accesses data corresponding to the electronic statements. A man-machine interface machine has an electronic statement sending and receiving portion and a man-machine interfacing portion. The electronic statement sending and receiving portion sends and receives electronic statements that include a job process request and a job process result to and from the network. The man-machine interfacing portion executes a man-machine interfacing process corresponding to the electronic statements.

14 Claims, 7 Drawing Sheets

FIG. 6A
FORMAT OF ELECTRONIC STATEMENTS A AND B

FIG. 6B
FORMAT OF ELECTRONIC STATEMENTS C AND D

FIG. 6C
FORMAT OF ELECTRONIC STATEMENT CONTROL

FIG. 7

DATA-INDEPENDENT TYPE COMPUTER SYSTEM: PROCESSING MACHINE, DATA MACHINE AND MAN-MACHINE INTERFACE THEREIN

BACKGROUND OF THE INVENTION

1. Field of the Invention

The present invention relates to a technology for constructing a computer system.

2. Description of the Related Art

In conventional computer systems, general-purpose operating systems (hereinafter referred to as OS) are executed on general-purpose hardware so as to use expensive hardware and run as many application programs as effectively as possible.

However, this general use results in redundancy. As technologies advance, the program of the OS becomes large and its operating time becomes long. Conventionally, many application programs are concurrently executed on one general-purpose computer machine. Thus, one computer machine has a large and complicated hardware construction. Consequently, the performance and reliability of the computer system deteriorate.

Nowadays, since the cost of the computer hardware is being dramatically increased, the disadvantages of the general use are becoming greater than the advantages thereof.

In addition, the construction and usage of the computer systems are different from those of the organization and job processing methods of companies and of human beings. Thus, when an expert in a particular field wants to computerize his job, difficulties will be encountered. This is because computer end users are not considered in the construction methods of conventional computer systems. In addition, since an expert in a particular field may not understand computer systems very well, it is the developers of computers who should construct computer systems. However, the developers similarly may not clearly understand the specifications of the job of each expert.

SUMMARY OF THE INVENTION

The present invention is made considering the above-described point of view. An object of the present invention is to realize a computer system that has high reliability and performance from a simple construction, and that corresponds to the structure of a job and procedures of a user thereof.

The present invention is a data-independent type computer system having a construction of which at least one of a processing machine, a data machine, and a man-machine interface machine is connected to a network, wherein the processing machine comprises a first electronic statement sending and receiving means, for receiving an electronic statement that includes a job process request from the network, sending an electronic statement that includes a job process result to the network, sending an electronic statement that includes a data access request to the network, and receiving an electronic statement that includes a data access result from the network, and a job process executing means for executing job processes corresponding to the electronic statements sent and received by the first electronic statement sending and receiving means, wherein the data machine comprises a second electronic statement sending and receiving means for receiving an electronic statement that includes the data access request from the network, and sending an electronic statement that includes the data access result to the network, a data storing means, and a data accessing means for accessing data corresponding to the electronic statements sent and received by the second electronic statement sending and receiving means to the data storing means, and wherein the man-machine interface machine comprises a third electronic statement sending and receiving means for sending an electronic statement that includes the job process request to the network, and receiving an electronic statement that includes the job process result from the network, and a man-machine interfacing means for executing a man-machine interfacing process corresponding to the electronic statements sent and received by the third electronic statements sending and receiving means.

According to the processing machine of the present invention, most of the functions used in the conventional OS are not required. In addition, since the data machine only requires a data retrieval function and a data update function or a data read function and a data write function, the functions thereof are very simple. Moreover, since the man-machine interface machine only requires a man-machine interface function, a data storage function can be omitted. Since the computer system is simplified in such a manner, the reliability of the entire system is significantly improved and a cheap CPU can be used for the processing machine or the like. Thus, the cost performance of the computer system can be significantly improved.

These and other objects, features and advantages of the present invention will become more apparent in light of the following detailed description of best mode embodiments thereof, as illustrated in the accompanying drawings.

DESCRIPTION OF PREFERRED EMBODIMENTS THEORY OF OPERATION

Figure 1:
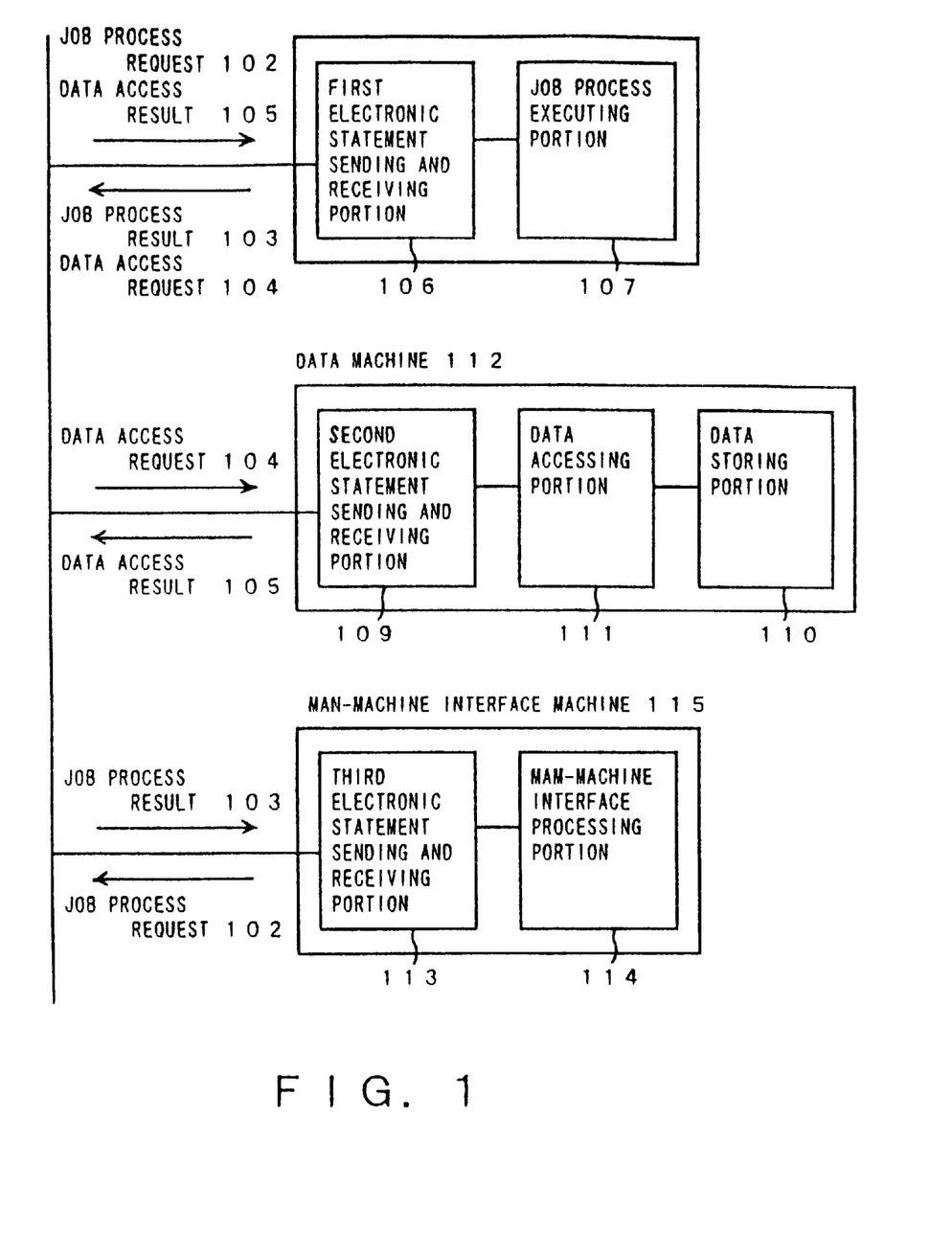
FIG. 1 is a block diagram of the present invention.

FIG. 1 is a block diagram of the present invention.

The present invention is a data-independent type computer system of which at least one of a processing machine 108, a data machine 112, and a man-machine interface machine 115 is connected to a network 101. It should be noted that the individual machines are in the scope of the present invention.

The processing machine 108 comprises a first electronic statement sending and receiving portion 106 and a job process executing portion 107. The first electronic statement sending and receiving portion 106 receives an electronic statement that includes a job process request 102 from the network 101, sends an electronic statement that includes a job process result 103 to the network 101, sends an electronic statement that includes a data access request 104 to the network 101, and receives an electronic statement that includes a data access result 105 from the network 101. The job process executing portion 107 executes job processes corresponding to the electronic statements sent and received by the first electronic statement sending and receiving portion 106.

The data machine 112 comprises a second electronic statement sending and receiving portion 109, a data storing portion 110, and a data accessing portion 111. The second electronic statement sending and receiving portion 109 receives the electronic statement that includes the data access request 104 from the network 101 and sends the electronic statement that includes the data access result 105 to the network 101. The data storing portion 110 stores data. The data accessing portion 111 accesses data corresponding to electronic statements sent and received by the second electronic statement sending and receiving portion to and from the data storing portion.

The man-machine interface machine 115 comprises a third electronic statement sending and receiving portion 113 and a man-machine interface portion 114. The third electronic statement sending and receiving portion 113 sends the electronic statement that includes the job process request 102 to the network 101 and receives the electronic statement that includes the job process result 103 from the network 101. The man-machine interface portion 114 executes a man-machine interface process corresponding to the electronic statements sent and received by the third electronic statement sending and receiving portion 113.

In the construction of the present invention, the network 101 is, for example, a local area network (LAN). However, it should be noted that the network 101 may be a complex of a plurality of LANs or a system that includes a public network.

In the above-described theoretical construction, the functions of the computer system are divided into three portions that are the man-machine interface portion, the processing portion, and the data portion. The man-machine interface machine 115, the processing machine 108, and the data machine 112 that accomplish dedicated functions are connected by the network 101.

Since such hardware portions having the dedicated functions are connected by the network, as a first advantage of the computer system of the present invention, the conventional complex system construction can be simplified. In other words, the function of the processing machine 108 can be greatly simplified. In other words, a hardware portion and a job process software are provided as a pair. Thus, with each hardware portion, only a specific software program is executed. Consequently, in memory management, since memory regions are permanently allocated, a virtual space control operation and so forth are not required. Thus, swap-in and swap-out control operations of program data are not required. In addition, since the task control operation is performed on a single task basis, the process management, the priority management, and so forth are not required. Thus, the processing machine 108 does not need most of the functions required in the conventional OS. Moreover, since the data machine 112 needs only a data retrieving function and a data updating function or a data writing function and a data reading function, the functions of the data machine 112 are greatly simplified. Furthermore, since the man-machine interface 115 requires only a man-machine interface function, it does not need a data storing function. Thus, the man-machine interface machine 115 can be easily provided by a unit such as a conventional personal computer. Since the construction of the computer system is simplified, the reliability of the entire system can be significantly improved and a cheap CPU can be used for the processing machine 108 or the like. Thus, the cost performance of the computer system can be significantly improved. In addition, since machines can be simply added or replaced corresponding to a job, a computer system with high flexibility, efficiency, and expandability corresponding to a job can be constructed. Moreover, when the data machine 112 is provided corresponding to each database, one particular job cannot be delayed by other jobs. In addition, since hardware and software of the processing machine 108 and the man-machine interface 115 are provided as a pair, when they are connected to the network and turned on, their setup is completed. If a defect occurs in one of these machines, the defective machine can simply be replaced. Thus, the operation management and the defect management of the entire computer system can be designated to the network 101 and the data machine 112. Consequently, the computer management can be dramatically simplified.

AS a second advantage of the computer system of the present invention, since a machine with a dedicated function is connected to the network, the communication specifications between each machine can easily be standardized. In reality, communications between each machine are standardized as electronic statements that are constructed of information (such as a user ID, a job ID, a screen ID, a file ID, and an SQL statement) that correlates to a job specification. With such electronic statements, job processes are requested for machines with respective independent dedicated functions. Thus, each machine can be reused and redundant development thereof can be reduced.

As a third advantage of the computer system of the present invention, the processing machine 108, the data machine 112, and so forth are provided for dedicated functions and data corresponding to a job. In addition, communications between each machine are limited to electronic statements at a job level. Thus, the computer system can be constructed and executed corresponding to the organization and job processing method of a company or the like. Consequently, even if an expert in a particular field does not have sufficient knowledge about the computer and network, he can easily construct a system corresponding to his requirement. As a result, labor and cost for constructing the computer systems for both the vendor and customers, can be significantly reduced.

Description of Preferred Embodiments

Next, with reference to the accompanying drawings, preferred embodiments of the present invention will be described.

Figure 2:
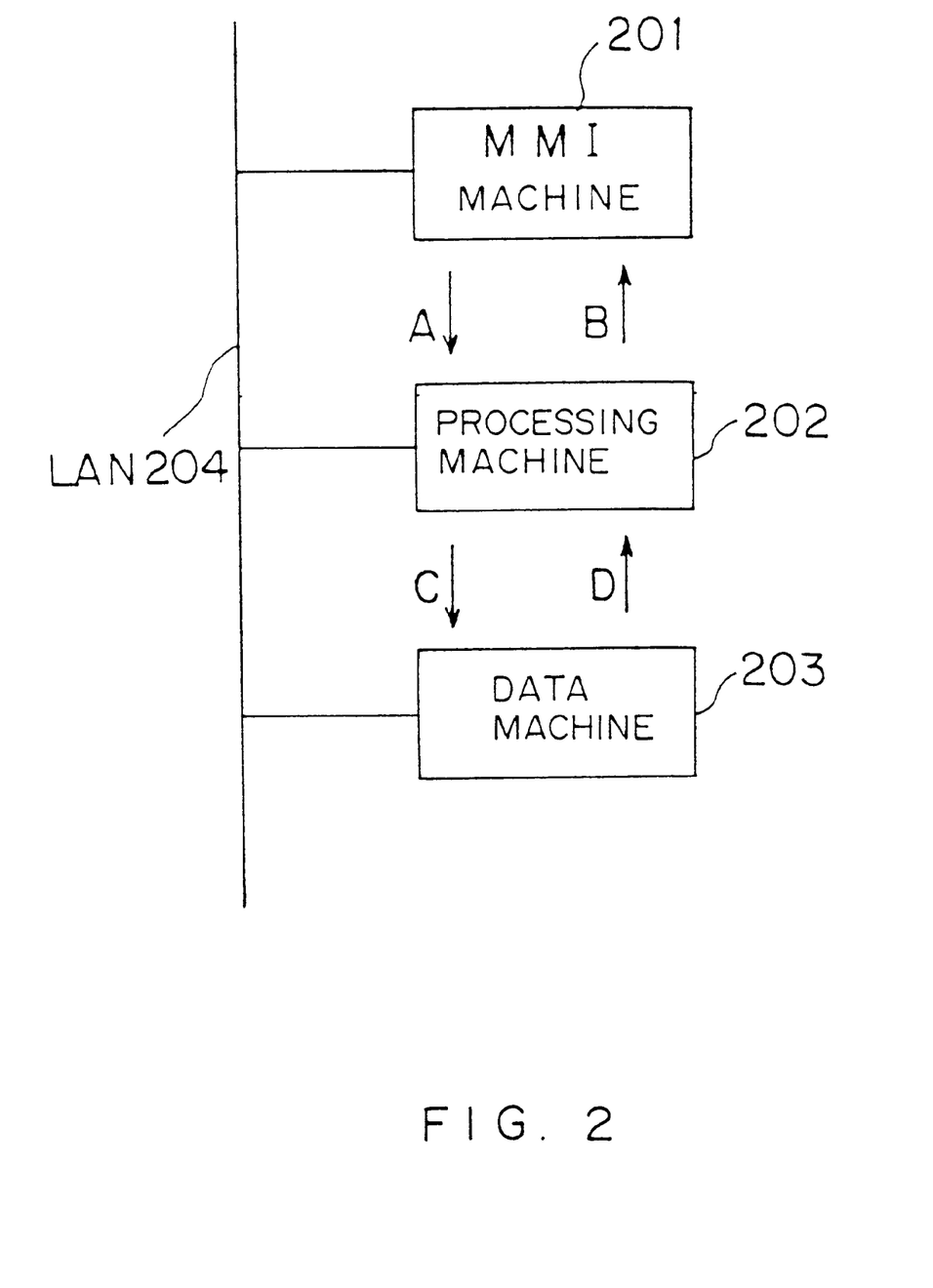
FIG. 2 is a block diagram showing the construction of an embodiment of the present invention.

FIG. 2 is a block diagram showing the construction of a data-independent type computer system according to a preferred embodiment of the present invention.

In the preferred embodiment, an MMI machine 201, a processing machine 202, and a data machine 203 share a particular job process.

The MMI machine 201, the processing machine 202, and the data machine 203 are connected by a local network (LAN) 204 so that communications between multiple machines are performed with electronic statements. Electronic statements (electronic statements A and B) are exchanged between the MMI machine 201 and the processing machine 202. Electronic statements (electronic statements C and D) are exchanged between the processing machine 202 and the data machine 203. However, electronic statements are not exchanged between the MMI machine 201 and the data machine 203. As will be described later, the interface between each machine is standardized. Each machine has a ROM that stores a system program and an application program. The number of MMI machines 201, the number of processing machines 202, and the number of data machines 203 are not limited. The LAN 204 may be connected to another LAN or a public network through a particular gateway machine that is a processing machine 202. In this case, the processing machine 202 in the LAN 204 can access the data machine 203 connected to the other network.

Figure 3:
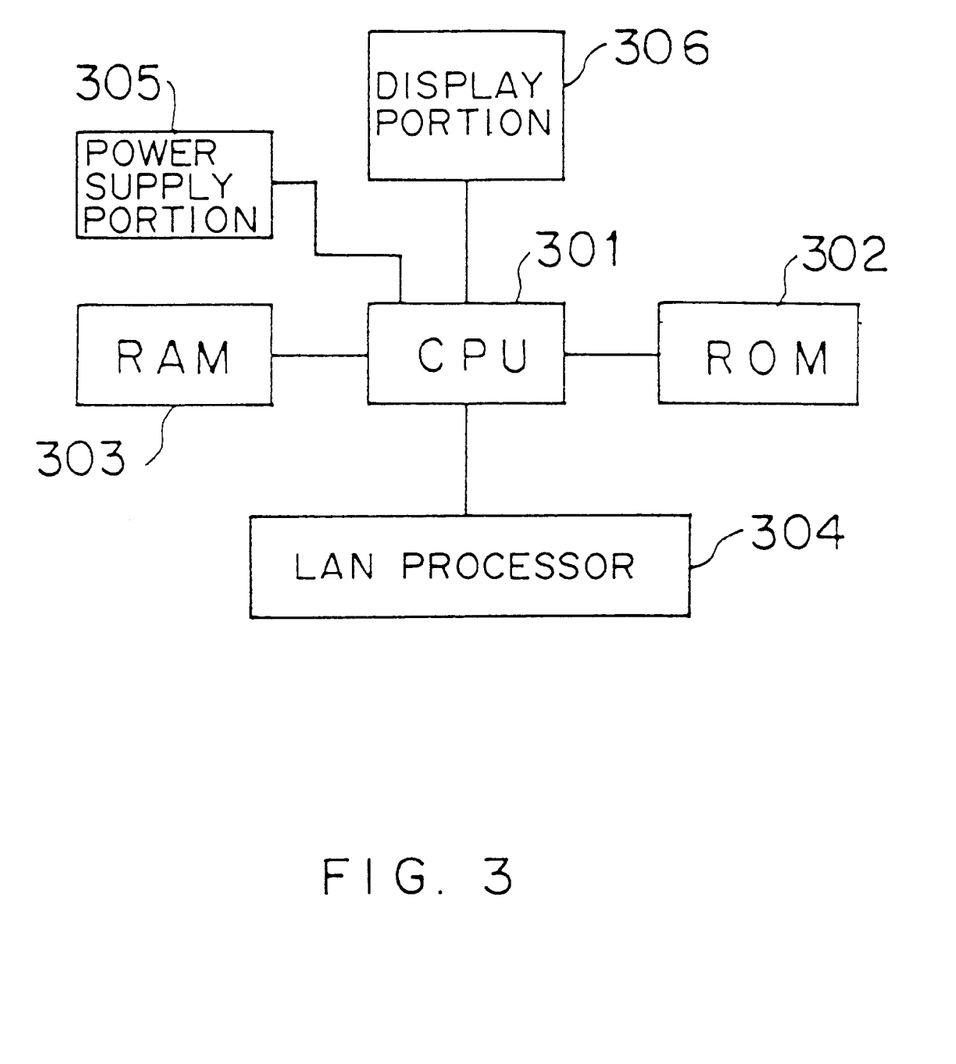
FIG. 3 is a block diagram showing the construction of an MMI machine.

The MMI machine 201 has a dedicated function of a man-machine interface. For example, as shown in FIG. 3, the MMI interface 201 comprises a CPU 301, a ROM 302, a RAM 303, LAN processor 304, a power supply portion 305, and a display portion 306. In addition to the display portion 306 shown in FIG. 3, the MMI machine 201 may include a special input unit (such as an image input and output unit, a sound input and output unit, or a touch screen) or a dedicated unit (such as an ATM). The LAN processor 304 is a connection interface to the LAN 204 in FIG. 2 and has similar functions to those of a conventional network interface.

When a job application is initiated, a screen or the like displayed on the display portion 306 of the MMI machine 201 is downloaded from the processing machine 202 that processes the job application. Thereafter, only control information of the screen that includes input and output items, a moving picture, and a sound is exchanged as electronic statements between the MMI machine 201 and the processing machine 202. The information downloaded from the processing machine 202 is stored in the MMI machine 201. However, when necessary, the information stored in the MMI machine 201 can be deleted so as to download other information.

In addition, the MMI machine 201 can execute a simple local process. In this case, the MMI machine 201 is provided with a dedicated data machine 203 and a processing machine 202. In other words, the MMI machine 201 has functions similar to those of a so-called personal computer.

Basically, the number of MMI machines 201 accords with the number of users. However, a plurality of users can alternatively use one MMI machine 201. In addition, each window of the display portion 306 of one MMI machine 201 can be designated to each user.

Figure 4:
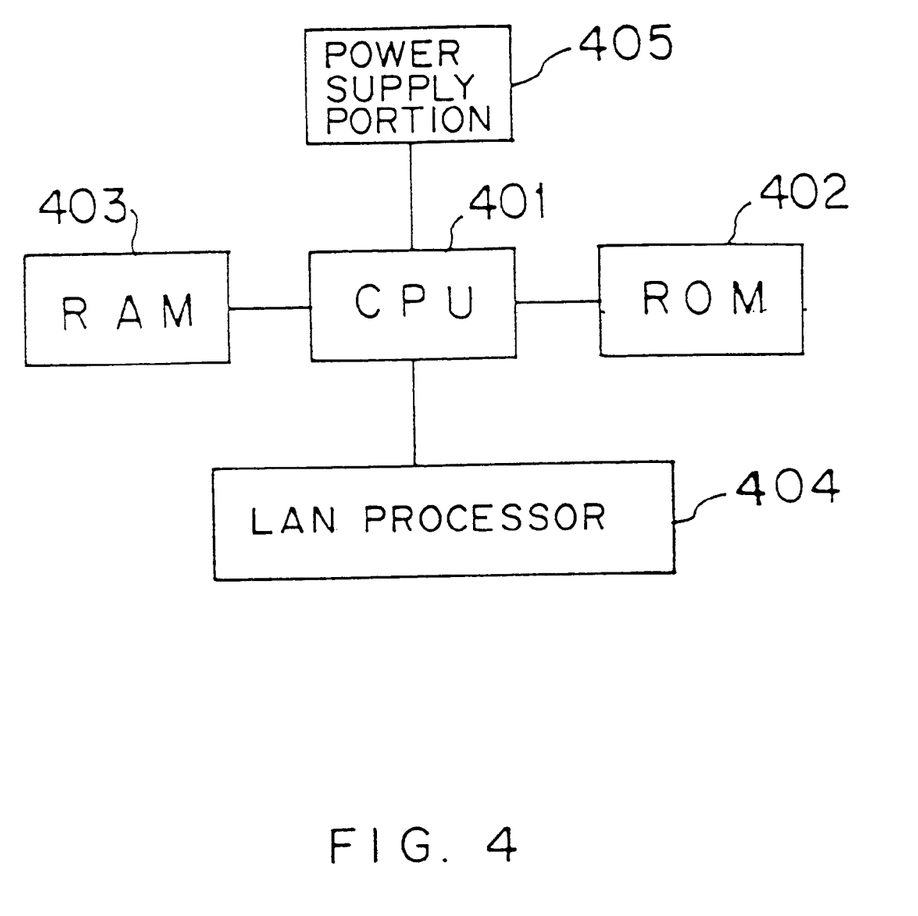
FIG. 4 is a block diagram showing the construction of a processing machine.

The processing machine 202 has the construction of a so-called single-board computer. For example, as shown in FIG. 4, the processing machine 202 comprises a CPU 401, a ROM 402, a RAM 403, a LAN processor 404, and a power supply portion 405.

In the processing machine 202, a conception of an operational design is not required. In other words, as with a conventional modem, the processing machine 202 can be operated by simply connecting it to the LAN 204.

The processing machine 202 is provided corresponding to each job process. Each processing machine 202 is connected to the LAN 204 through each LAN processor 404. A job process is divided into sub processes in such a manner that communications between each processing machine 202 are not performed.

When a job process is to be performed on a multiplex basis, a plurality of processing machines 202 are connected to the LAN 204. In this case, the processing machines 202 operate interdependently. At this point, each processing machine 202 independently accesses data in the data machine 203. In other words, the processing machine 202 is constructed on a so-called data-oriented process basis. To accomplish the data-oriented process, a job application that is executed on the processing machine 202 is executed as an online program that communicates with the MMI machine 201 or the data machine 203 using electronic statements (which will be described later). In this case, the electronic statements are standardized, as will be described later.

Figure 5:
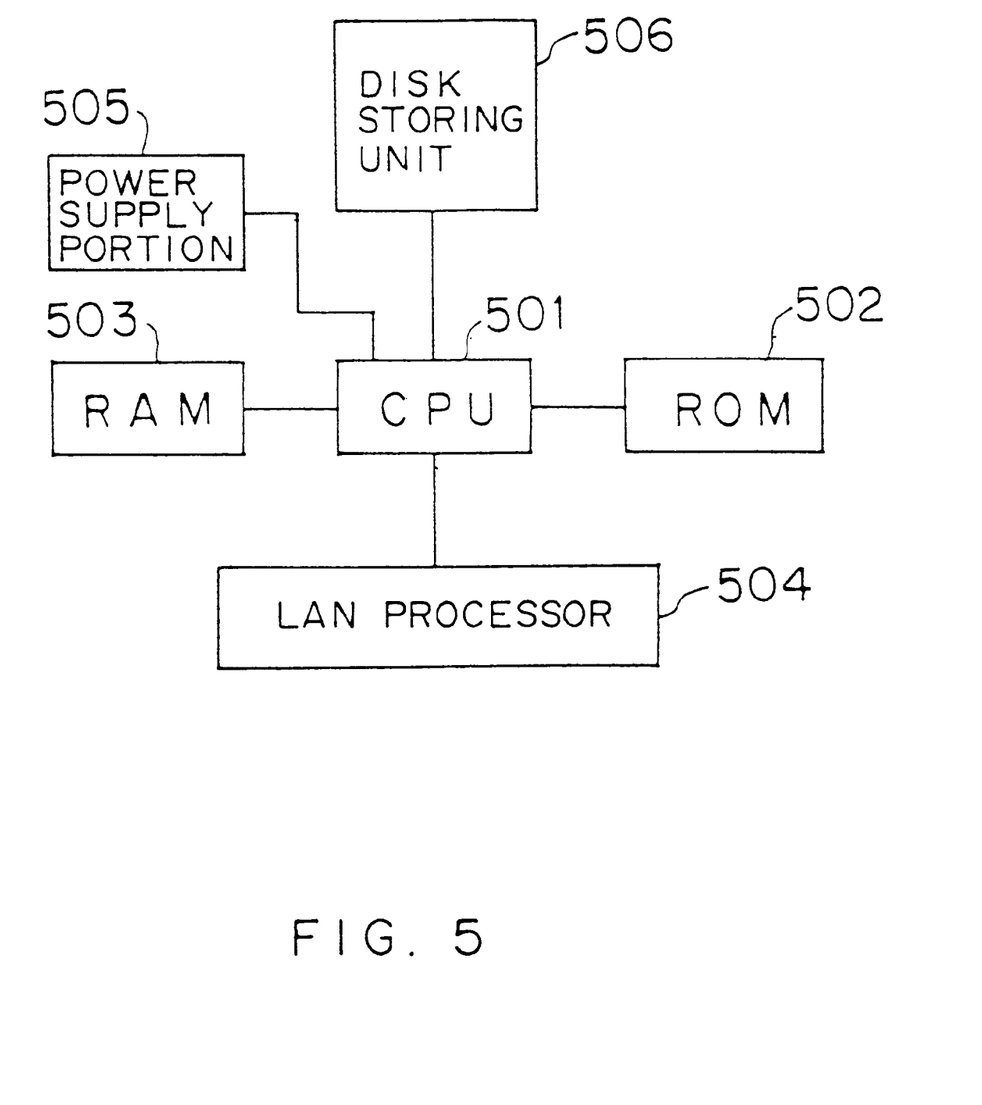
FIG. 5 is a block diagram showing the construction of a data machine.

FIG. 5 illustrates data machine 203 as a so-called file server. The data machine has a dedicated function of a data management function or a database management function. For example, as shown in FIG. 5, the data machine 203 comprises a CPU 501, a ROM 502, a RAM 503, an LAN processor 504, a power supply portion 505, and a disk storing unit 506.

A database in any format can be stored in the disk storing unit 506. However, each database can be managed in a common format by a dedicated utility machine that is a processing machine 202. The difference between each database is absorbed by an interface portion of the data machine 203.

External data that is input from a gateway unit, a magnetic tape (MT) drive unit, a floppy disk drive unit, or the like, is converted into the common format by the utility machine and then stored in the data machine 203. A new database is constructed by the utility machine.

Next, with reference to FIGS. 6A, 6B, and 6C, the structures of electronic statements that are exchanged between each machine will be described.

The electronic statements can be categorized as electronic statements A and B that are exchanged between the MMI machine 201 and the processing machine 202, and electronic statements C and D that are exchanged between the processing machine 202 and the data machine 203.

Figure 6A:
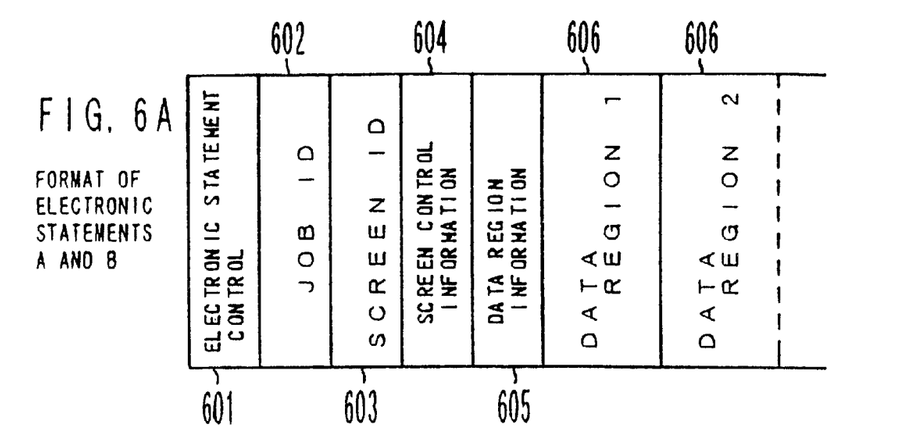
FIGS. 6(A), 6(B), and 6(C) are schematic diagrams showing formats of electronic statements.

The electronic statements A and B that are exchanged between the MMI machine 201 and the processing machine 202 have the structure shown in FIG. 6A.

In FIG. 6A, an electronic statement control 601 is placed at the beginning of each of the electronic statements A and B. The electronic statement control 601 has the structure shown in FIG. 6C.

Figure 6B:
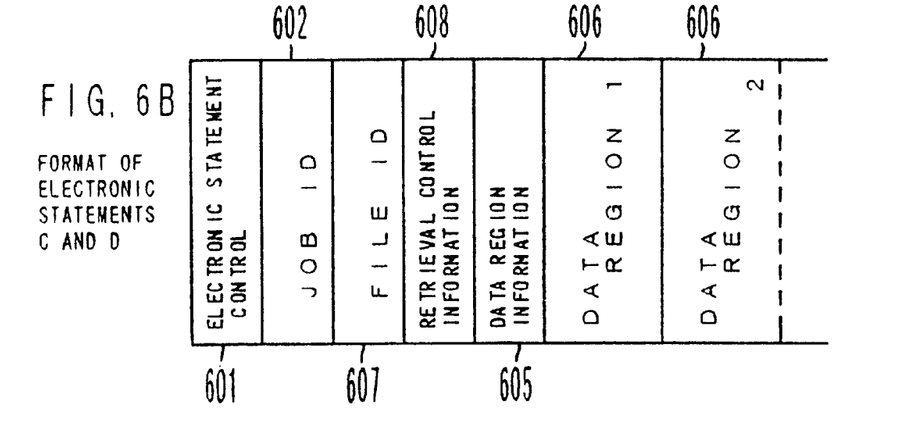
Figure 6C:
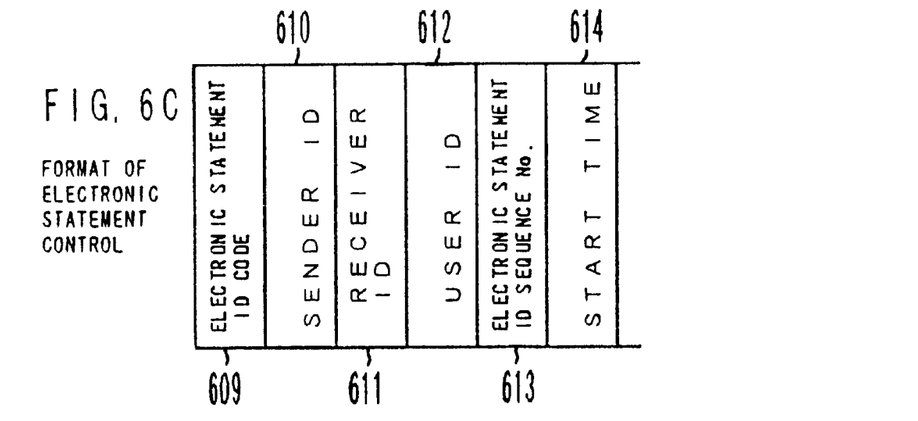

In FIG. 6C, an electronic statement identification code 609 represents a type of electronic statement such as a normal electronic statement (for example, an electronic statement A or B), an electronic statement for a unit connection definition that is automatically generated, or an electronic statement for security information.

A sender ID 610 and a receiver ID 611 are global addresses of the LAN 204, for example, physical addresses (network addresses) allocated to LAN processors 304, 404, and 504 of individual machines.

A user ID 612 represents a user who generates an electronic statement thereof.

An electronic statement identification sequence No. 613 represents a transmission sequence of electronic statements in the case where information is divided into a plurality of electronic statements and transmitted.

A start time 614 represents the time at which the electronic statement is sent. The start time 614 is used for trouble shooting, response measurement, or the like.

Returning to the structure of FIG. 6A, a job ID 602 is an identifier that identifies the type of a job process (such as an order acceptance process of a daily/hourly process or an output process of a balance sheet) performed in the processing machine 202.

A screen ID 603 is an identifier that identifies one of a plurality of screens displayed on the display portion 306 of the MMI machine 201 in one job process.

A screen control information 604 is information that represents a display control mode such as a continuous display mode or a blink mode of the display portion 306 of the MMI machine 201, or information for controlling a moving picture displayed on the display portion 306.

A data region information 605 is information that represents whether or not data is stored in at least one data region 606.

A data region 606 stores a screen input item or a screen output item for the display portion 306 of the MMI machine 201.

The electronic statements C and D that are exchanged between the processing machine 202 and the data machine 203 have the structure shown in FIG. 6B.

In FIG. 6B, an electronic control 601 is placed at the beginning of each of the electronic statements C and D. The electronic statement control 601 has the same structure as that shown in FIG. 6C as with the electronic statements A and B shown in FIG. 6A.

A job ID 602 is the same as that of the electronic statements A and B shown in FIG. 6A.

A file ID 607 is an identifier that identifies a file to be accessed.

A retrieval control information 608 represents an additional retrieval condition designated to a process in the case that retrieved data is redundant, that data corresponding to a designated condition is not found, or that a retrieval error takes place.

A data region information 605 is the same as that of the electronic statements A and B shown in FIG. 6A.

A data region 606 is the same as that of the electronic statements A and B shown in FIG. 6A. When the electronic statement C that is sent from the processing machine 202 to the data machine 203 designates a retrieval process, a write condition using SQL language that is a database operation language, and a retrieval key thereof are stored in the data region 606. When the electronic statement C designates a write process, write data is stored in the data region 606. On the other hand, resultant data corresponding to a retrieval process or a write process designated by the electronic statement C is stored in the data region 606 of the electronic statement D that is sent from the data machine 203 to the processing machine 202.

Each electronic statement shown in FIGS. 6A, 6B, and 6C is stored in a data field of each data packet and then transmitted over the LAN 204 corresponding to a protocol thereof.

Figure 7:
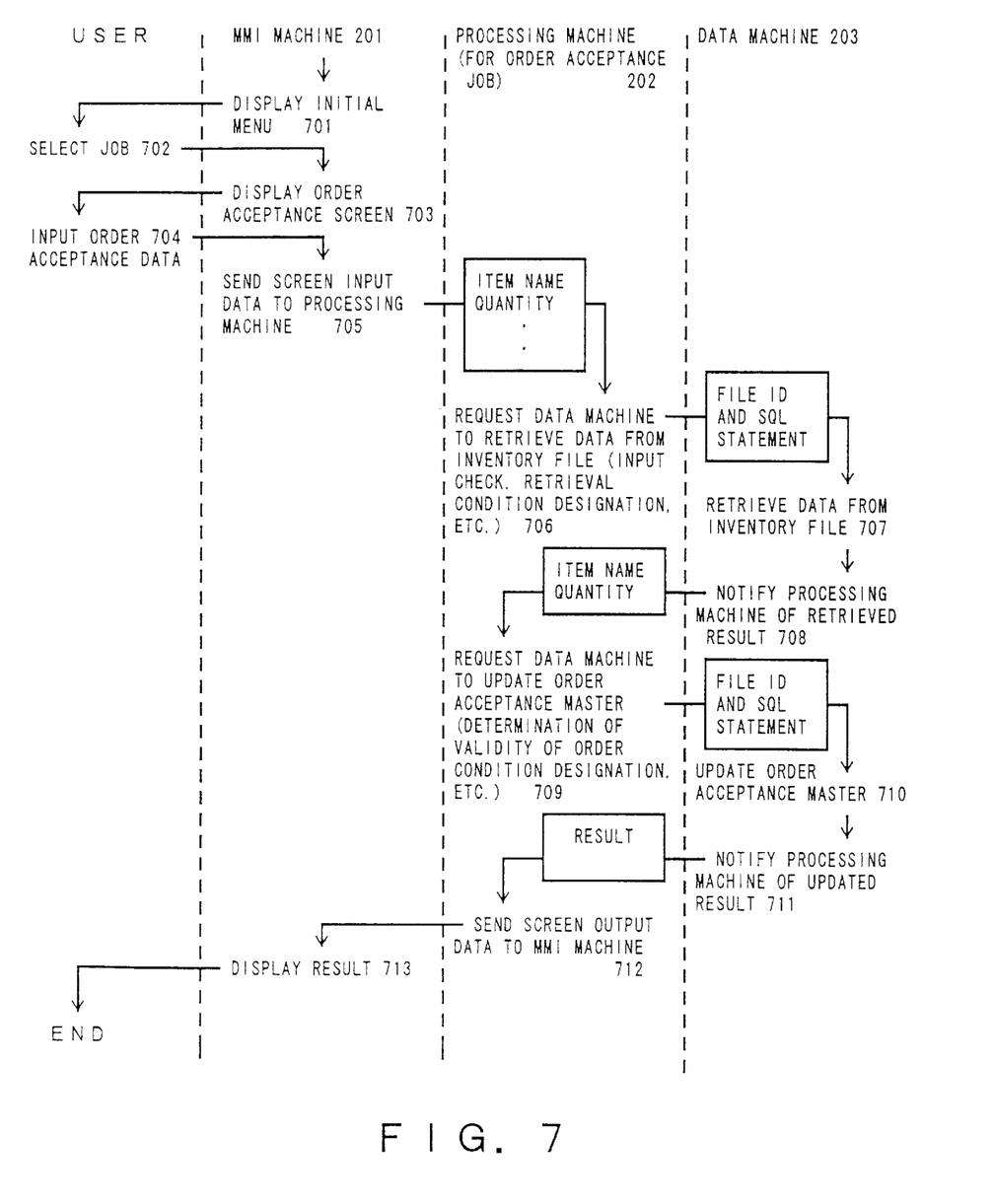
FIG. 7 is a schematic diagram for explaining the operation of an embodiment of the present invention.

With reference to FIG. 7, the operation of a job process accomplished with the above-described electronic statements will be described. FIG. 7 is a schematic diagram for explaining an example of an order acceptance job.

First of all, the MMI machine 201 displays an initial menu on the display portion 306 (at step 701).

When a user such as a telephone operator selects an order acceptance job (at step 702), the MMI machine 201 displays an order acceptance screen on the display portion 306 (at step 703).

The user inputs order data on the screen (at step 704). Input items of the order data are, for example, an item name, its code, and its quantity.

The MMI machine 201 sends the input items as the electronic statement A to the processing machine 202 (at step 705).

The processing machine 202 retrieves data from an inventory file so as to check the inventory. In other words, the processing machine 202 generates an SQL statement that represents a retrieval condition of the inventory file corresponding to the input items received from the MMI machine 201, places the SQL statement and a file ID in the electronic statement C, and sends the resultant electronic statement C to the data machine 203 (at step 706).

The data machine 203 retrieves data from the inventory file corresponding to the content of the electronic statement C received from the processing machine 202 (at step 707) and notifies the processing machine 202 of the retrieved result as the electronic statement D (at step 708).

When there is stock, the processing machine 202 generates an SQL statement that requests the data machine 203 to update an order acceptance master, places the SQL statement and a file ID in the electronic statement C, and sends the resultant electronic statement C to the data machine 203 (at step 709).

The data machine 203 executes an update process for the order acceptance master corresponding to the content of the electronic statement C received from the processing machine 202 (at step 710), and notifies the processing machine 202 of the updated result as the electronic statement D (at step 711).

After the data machine 203 notifies the processing machine 202 of the updated result, the processing machine 202 sends screen output data as the electronic statement B to the MMI machine 201 (at step 712). The MMI machine 201 displays the processed result on the display portion 306 (at step 713).

In the above-described order acceptance job process, the data machine 203 that stores the inventory file may be different from the data machine 203 that stores the order acceptance master. The processing machine 202 that performs the order acceptance job is, for example, a single machine.

In the above-described preferred embodiments, the functions of the computer system are divided into three portions that are an MMI (man-machine interface) portion, a processing portion, and a data portion. The MMI machine 201, the processing machine 202, and the data machine 203 that accomplish their dedicated functions are connected by the LAN 204.

Since such hardware portions having the dedicated functions are connected by the network, as a first advantage of the computer system of the present invention, the conventional complex system construction can be simplified. In other words, the function of the processing machine 202 can be greatly simplified as shown in FIG. 4 and so forth. In other words, a hardware portion and a job process software are provided as a pair. Thus, with each hardware portion, only a specific software program is executed. Consequently, for memory management, since memory regions are permanently allocated, a virtual space control operation and so forth are not required. Thus, swap-in and swap-out control operations of program data are not required. In addition, since the task control operation is performed on a single task basis, the process management, the priority management, and so forth are not required. Thus, the processing machine 202 does not need most of the functions required in the conventional OS. Moreover, since the data machine 203 needs only a data retrieving function and a data updating function, or a data reading function and a data writing function, the functions of the data machine 203 are greatly simplified. Furthermore, since the MMI machine 201 requires only a man-machine interface function, it does not need a data storing function. Thus, the MMI machine 201 can easily be provided by a unit such as a conventional personal computer. Since the construction of the computer system is simplified, the reliability of the entire system can be significantly improved, and a cheap CPU can be used for the processing machine 202 or the like. Thus, the cost performance of the computer system can be significantly improved. In addition, since machines can be simply added or replaced according to a particular job, a computer system having high flexibility, efficiency, and expandability corresponding to the job, can be constructed. Moreover, when the data machine 203 is provided corresponding to each database, a particular job cannot be delayed by other jobs. In addition, since hardware and software of the processing machine 202 and the MMI machine 201 are provided as a pair, when they are connected to the network and turned on, their setup is completed. If a defect occurs in one of these machines, the defective machine can simply be replaced. Thus, the operation management and the defect management of the entire computer system can be designated to the LAN 204 (network) and the data machine 203. Consequently, the computer management can be dramatically simplified.

As a second advantage of the computer system of the present invention, since a machine with a dedicated function is connected to the network, the communication specifications between each machine can easily be standardized. In reality, communications between each machine are standardized as electronic statements that are constructed of information (such as a user ID 612, a job ID 602, a screen ID 603, a file ID 607, and an SQL statement) that correlates to a job specification. With such electronic statements, job processes are requested for machines with respective independent dedicated functions. Thus, each machine can be reused, and redundant development thereof can be reduced.

As a third advantage of the computer system of the present invention, the processing machine 202, the data machine 203, and so forth are provided for dedicated functions and data corresponding to a job. In addition, communications between each machine are limited to electronic statements at a job level. Thus, the computer system can be constructed and executed corresponding to the organization and job processing method of a company or the like. Consequently, even if an expert in a particular field does not have sufficient knowledge about the computer and network, he can easily construct a system corresponding to his requirement. As a result, labor and cost for constructing the computer systems for both the vendor and customers, can be greatly reduced.

As a fourth advantage of the computer system of the present invention, since the data machine 203 is connected to the LAN 204, to another LAN, or to a public network as independent facilities, and the accessing to the data machine 203 is standardized as electronic statements at a job level, a data center that intensively manages data can be established. Thus, the cost and risk for data storage can be significantly reduced.

In addition, in the above-described preferred embodiments, unlike with the related art reference, since an electronic statement corresponding to a job process is sent, the traffic within the network does not adversely increase. For example, when a database of the data machine 203 is accessed, a transaction file or the like is directly brought to the processing machine 202, stored in the memory, and processed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data-independent type computer system, comprising:
   at least one of a processing machine, a data machine, and a man-machine interface machine connected to a network,
   said processing machine having hardware to implement software functions dedicated to job processing, including
      first electronic statement sending/receiving means for receiving an electronic statement that includes a job process request from said network, sending an electronic statement that includes a job process result to said network, sending an electronic statement that includes a data access request to said network, and receiving an electronic statement that includes a data access result from said network; and
      job process executing means for executing a job process corresponding to the electronic statement sent and received by said first electronic statement sending/receiving means,
   said data machine having hardware to implement software functions dedicated to data processing, including
      second electronic statement sending/receiving means for receiving an electronic statement that includes the data access request from said network and sending a data access result to said network;
      data storing means for storing data; and
      data accessing means for accessing data corresponding to the electronic statements sent and received by said second electronic statement sending/receiving means to said data storing means, and
   said man-machine interface machine having hardware to implement software functions dedicated to processing of a man-machine interface, including
      third electronic statement sending/receiving means for sending an electronic statement that includes the job process request to said network and receiving an electronic statement that includes the job process result from said network; and
      man-machine interfacing means for executing a man-machine interfacing process corresponding to the electronic statements sent and received by said third electronic statements sending and receiving means.

2. An information processing unit connected to a network, comprising:
   first electronic statement sending/receiving means for receiving an electronic statement that includes a job process request from said network, sending an electronic statement that includes a job process result to said network, sending an electronic statement that includes a data access request to said network, and receiving an electronic statement that includes a data access result from said network; and
   job process executing means for executing a job process corresponding to the electronic statements sent and received by said first electronic statement sending/receiving means,
   wherein said information processing unit has hardware to implement a software function dedicated to job processing, and said job process executing means does not directly access data which is contained within the electronic statements from a database.

3. An information processing unit, connected to a network, comprising:
- electronic statement sending/receiving means for receiving an electronic statement that includes a data access request from said network and sending a data access result to said network;
- data storing means for storing data; and
- data accessing means for accessing data corresponding to the electronic statement sent and received by said electronic statement sending/receiving means and for executing a job process corresponding to the accessed data,
- wherein said information processing unit has hardware to implement a software function dedicated to data processing, and said data accessing means does not process data which is contained within the electronic statement by changing the data.

4. An information processing unit, connected to a network, comprising:
- electronic statement sending/receiving means for sending an electronic statement that includes a job process request to said network and receiving an electronic statement that includes a job process result from said network; and
- man-machine interfacing means for executing a man-machine interfacing process corresponding to the electronic statement sent and received by said electronic statement sending/receiving means,
- wherein said man-machine interfacing means has hardware to implement a software function dedicated to processing of the man-machine interfacing process, and said man-machine interfacing means does not directly access data which is contained within the electronic statement from a database, and does not process data which is contained within the electronic statement by changing the data.

5. A data-independent type computer system, comprising:
- a processing machine, intended as an information processing unit, dedicated to processing as an information processing unit having hardware to implement software functions;
- a man-machine interface machine, intended as an information processing unit, having hardware to implement software functions dedicated to a man-machine interface; and
- a data machine, intended as an information processing unit, having hardware to implement software functions dedicated to database management,
- wherein said processing machine, said man-machine interface machine, and said data machine are connected to a network, and processes are implemented by executing mutually exclusive and dedicated functions by each of said processing machine, said man-machine interface machine, and said data machine.

6. The data-independent type computer system according to claim 5, wherein hardware and software are provided together for each of said processing machine and said man-machine interface machine, and only dedicated software is executed for each hardware.

7. The data-independent type computer system according to claim 6, wherein said processing machine or said data machine is arranged for each of dedicated jobs.

8. The data-independent type computer system according to claim 5, wherein a communication made between said processing machine, said man-machine interface machine, and said data machine via the network is limited to an electronic statement of a job level.

9. A data-independent computer system, comprising:
- a network; and
- at least one of
  - a processing unit, connected to said network, having hardware to implement software functions dedicated to processing jobs in accordance with instructions received via said network;
  - a man-machine interface, connected to said network, having hardware to implement software functions dedicated to providing an interface between users and said data-independent computer system, including identifying the instructions to be processed by said processing unit; and
  - a data access unit, connected to said network, having hardware to implement software functions dedicated to storing and retrieving data produced and required by the instructions processed by said processing unit in response to requests received from at least one of said processing unit and said man-machine interface,
- wherein said man-machine interface does not directly access data which is contained within the instruction from a database, and does not process data which is contained within the instructions by changing the data.

10. A modular computer system, comprising:
- a network;
- a man-machine interface, connected to said network, having hardware to implement software functions dedicated to man-machine interface processing for a user of said modular computer system, including accepting instructions and data from the user and sending the instructions and data to said network;
- a processing unit, coupled to said network, having hardware to implement software functions dedicated to job processing based on the instructions received via said network; and
- a data access unit, connected to said network, having hardware to implement software functions dedicated to data processing, to store and retrieve data produced and required by the instructions processed by said processing unit in response to requests received from at least one of said processing unit and said man-machine interface,
- wherein said man-machine interface does not directly access data which is contained within the instruction from a database, and does not process data which is contained within the instructions by changing the data.

11. A data-independent type computer system in which at least one of a processing machine, having hardware to implement software functions dedicated to processing, a man-machine interface machine, having hardware to implement software functions dedicated to man-machine interface, and a data machine, having hardware to implement software functions dedicated to database management, is connected to a network, wherein processes are implemented by executing mutually exclusive and dedicated functions by each of said processing machine, said man-machine interface machine, and said data machine, wherein a communication made between said processing machine, said man-machine interface machine, and said data machine via the network, is limited to an electronic statement of a job level.

12. A data-independent type computer system, comprising:
- a processing machine, intended as an information processing unit, having hardware to implement software functions dedicated to job processing; and a man-machine interface machine intended as an information processing unit, having hardware to implement software functions dedicated to processing a man-machine interface, wherein said processing machine and said man-machine interface machine are connected to a network, and processes are implemented by executing mutually exclusive and dedicated functions by each of said processing machine and said man-machine interface machine, and wherein a communication made between said processing machine and said man-machine interface machine is limited to an electronic statement of a job level.

13. A data-independent type computer system, comprising:

a man-machine interface machine intended as an information processing unit, having hardware to implement functions dedicated to processing of a man-machine interface; and a data machine, intended as an information processing unit, having hardware to implement software functions dedicated to database management, wherein said man-machine interface machine and said data machine are connected to a network, and processes are implemented by executing mutually exclusive and dedicated functions by each of said man-machine interface machine and said data machine, and wherein a communication made between said man-machine interface machine and said data machine is limited to an electronic statement of a job level.

14. A data-independent type computer system, comprising:

a processing machine, intended as an information processing unit, having hardware to implement functions dedicated to job processing; and a data machine, intended as an information processing unit, having hardware to implement software functions dedicated to database management, wherein said processing machine and said data machine are connected to a network, and processes are implemented by executing mutually exclusive and dedicated functions by each of said processing machine and said data machine, and wherein a communication made between said processing machine and said data machine is limited to an electronic statement of a job level.

* * * * *